(12) United States Patent
Kao et al.

(10) Patent No.: US 7,233,450 B2
(45) Date of Patent: *Jun. 19, 2007

(54) REFLECTIVE COLOR WHEEL

(75) Inventors: Po-Sung Kao, Tan-Tzu Hsiang (TW); Te-Wei Liu, Tan-Tzu Hsiang (TW)

(73) Assignee: Asia Optical Co., Inc., Taichung (TW)

( * ) Notice: Subject to any disclaimer, the term of this patent is extended or adjusted under 35 U.S.C. 154(b) by 0 days.

This patent is subject to a terminal disclaimer.

(21) Appl. No.: 11/414,596

(22) Filed: May 1, 2006

(65) Prior Publication Data

US 2006/0245093 A1     Nov. 2, 2006

(30) Foreign Application Priority Data

May 2, 2005     (TW) ............................... 94114115 A (51) Int. Cl.
 *G02B 5/22* (2006.01)
(52) U.S. Cl. ................. 359/891; 359/885; 359/889; 348/743; 356/418; 353/84
(58) Field of Classification Search ........... 359/891, 359/892, 885, 889; 348/743; 356/418; 353/84; 362/293
See application file for complete search history.

(56) References Cited

U.S. PATENT DOCUMENTS 6,824,270 B2 * 11/2004 Kim et al. .................... 353/31
2003/0234913 A1 * 12/2003 Kim et al. .................... 353/84

* cited by examiner

*Primary Examiner*—Leonidas Boutsikaris
(74) *Attorney, Agent, or Firm*—Pai Patent & Trademark Law Firm; Chao-Chang David Pai (57) ABSTRACT

A reflective color wheel is adapted to receive composite source light provided by a light source, and includes a plurality of multi-layer light-reflecting sections for splitting the composite source light into a plurality of colored light beam components. Each of the multi-layer light-reflecting sections includes a plurality of light-filtering layers stacked along an axis. Each of the light-filtering layers of each of the multi-layer light-reflecting sections is capable of reflecting light within a predefined distinct wavelength range, and permits transmission of light outside the predefined distinct wavelength range therethrough. Sequences of the light-filtering layers of an adjacent pair of the multi-layer light-reflecting sections are different from each other.

11 Claims, 10 Drawing Sheets

REFLECTIVE COLOR WHEEL

CROSS-REFERENCE TO RELATED APPLICATION

This application claims priority of Taiwanese Application No. 094114115, filed on May 2, 2005.

BACKGROUND OF THE INVENTION

1. Field of the Invention

The invention relates to a color wheel, more particularly to a reflective color wheel that is capable of reducing losses in light energy to improve light utilization.

2. Description of the Related Art

Figure 1:
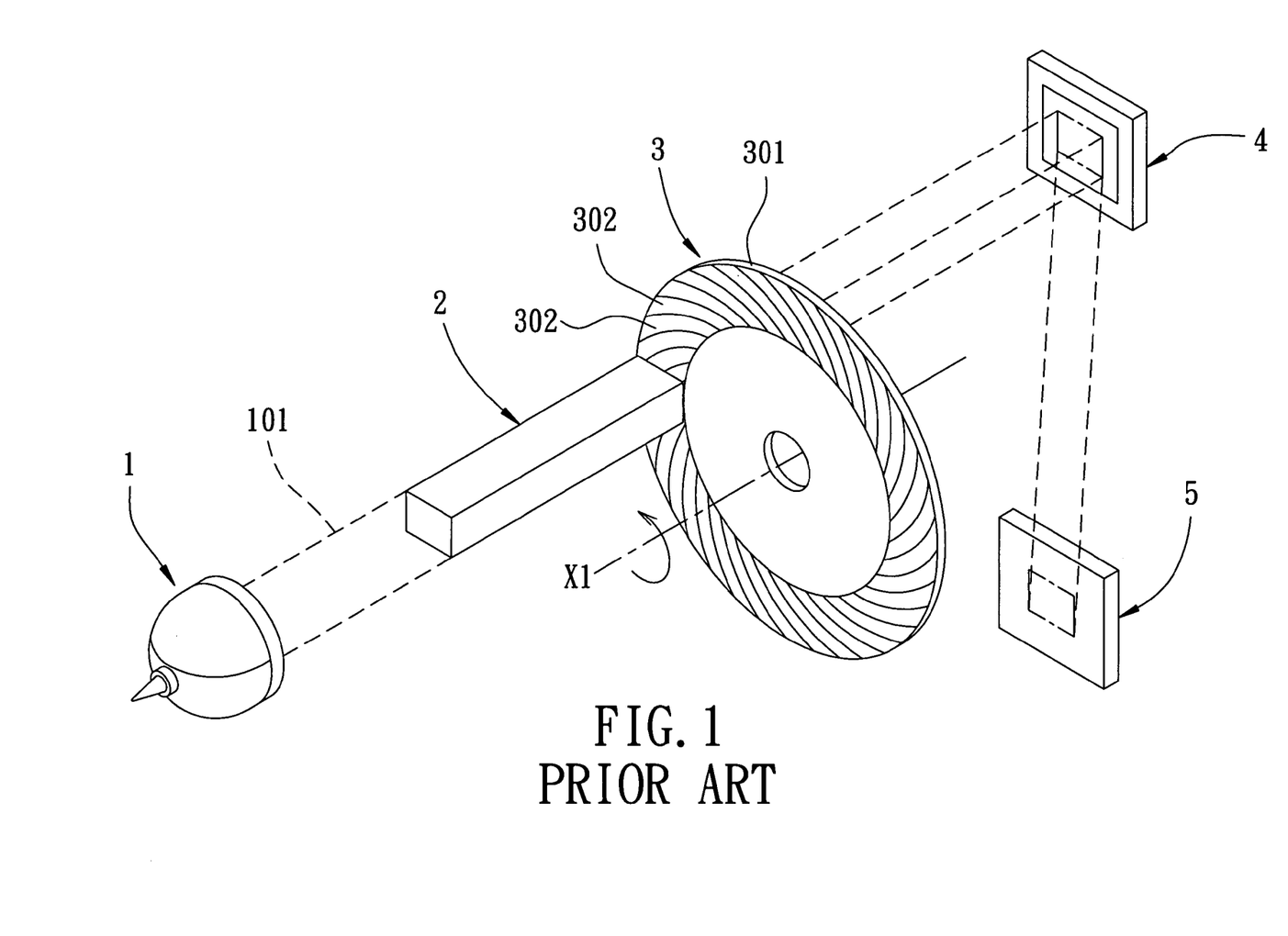
FIG. 1 is a schematic view of a conventional optical projecting system.
Figure 2:
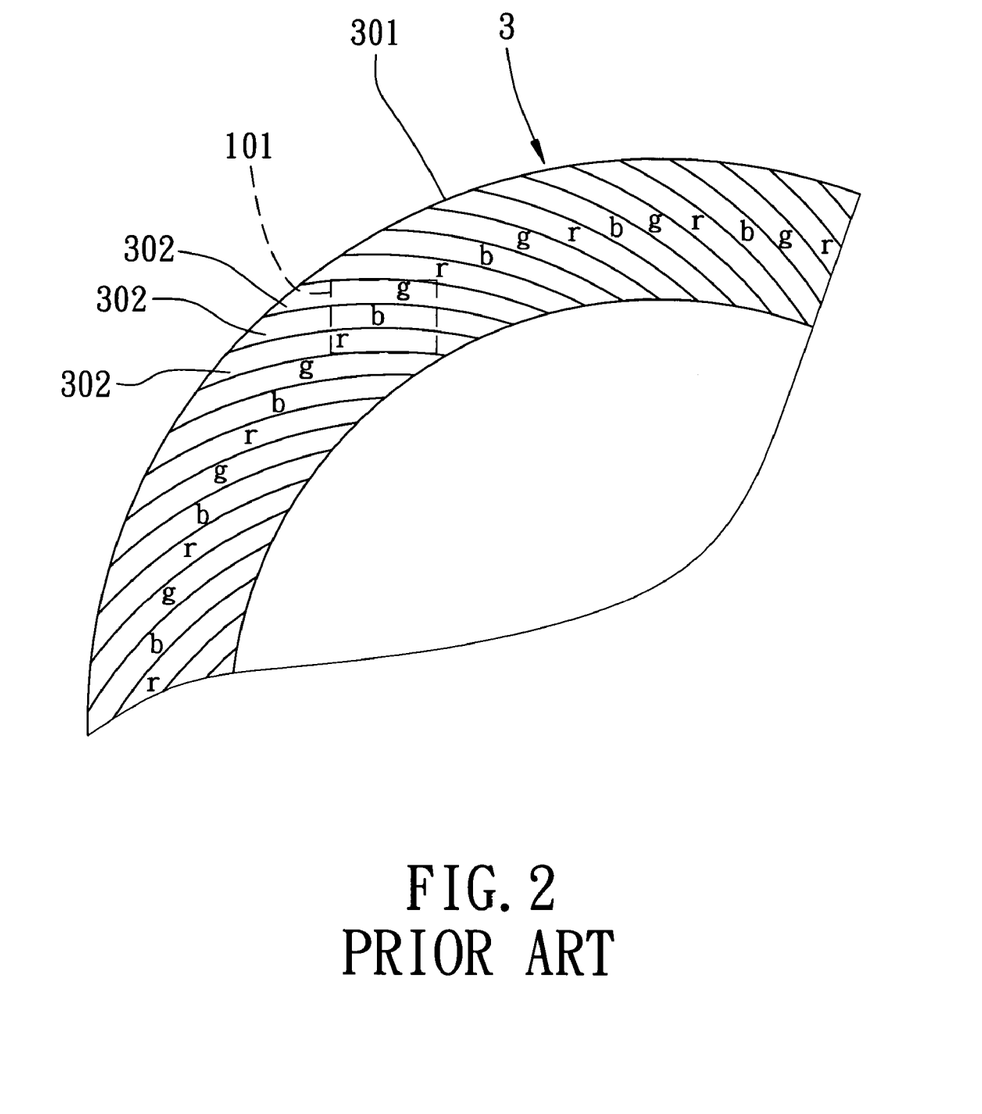
FIG. 2 is a fragmentary schematic view of a transmissive color wheel used in the conventional optical projecting system.

As shown in FIG. 1, a conventional optical projecting system includes a light source 1, a light tunnel 2, a transmissive color wheel 3, a digital micro-mirror device (DMD) 4, and a screen 5. The light source 1 is capable of generating source light 101. The light tunnel 2 is capable of receiving, guiding, and focusing the source light 101 to result in focused light. The transmissive color wheel 3 is rotatable about a rotation axis (X1), and includes a plurality of spiral light-filtering components 301 that are distributed around the rotation axis (X1). The light-filtering components 301 of the transmissive color wheel 3 include sequentially arranged red, blue and green light-filtering components (r), (b), (g), as illustrated in FIG. 2. The red, blue and green light-filtering components (r), (b), (g) allow transmission of red, blue and green light therethrough, respectively. The transmissive color wheel 3 rotates at an extremely high speed about the rotation axis (X1) as the focused light exits the light tunnel 2 so as to filter the focused light into red, blue, and green focused light components sequentially and cyclically. The red, blue, and green focused light components are subsequently projected toward the DMD 4, which modulates the red, blue, and green focused light components into red, blue and green modulated light components, respectively, and projects them onto the screen 5 so that colored images are presented on the screen 5.

Although by utilizing the transmissive color wheel 3, the conventional optical projecting system is capable of projecting colored images, the following shortcomings exist during use:

1. As shown in FIG. 2, when the focused light passes through the red light-filtering component (r), only the red focused light component thereof is transmitted toward the DMD 4, while the blue and green focused light components are reflected back to the light tunnel 2. Similarly, when the focused light passes through the blue light-filtering component (b), only the blue focused light component thereof is transmitted toward the DMD 4, while the red and green focused light components are reflected back to the light tunnel 2. When the focused light passes through the green light-filtering component (g), only the green focused light component thereof is transmitted toward the DMD 4, while the red and blue focused light components are reflected back to the light tunnel 2. This results in high losses in light energy, i.e., reduction in light utilization, in addition to presenting adverse effects on brightness of projected images.

Figure 3:
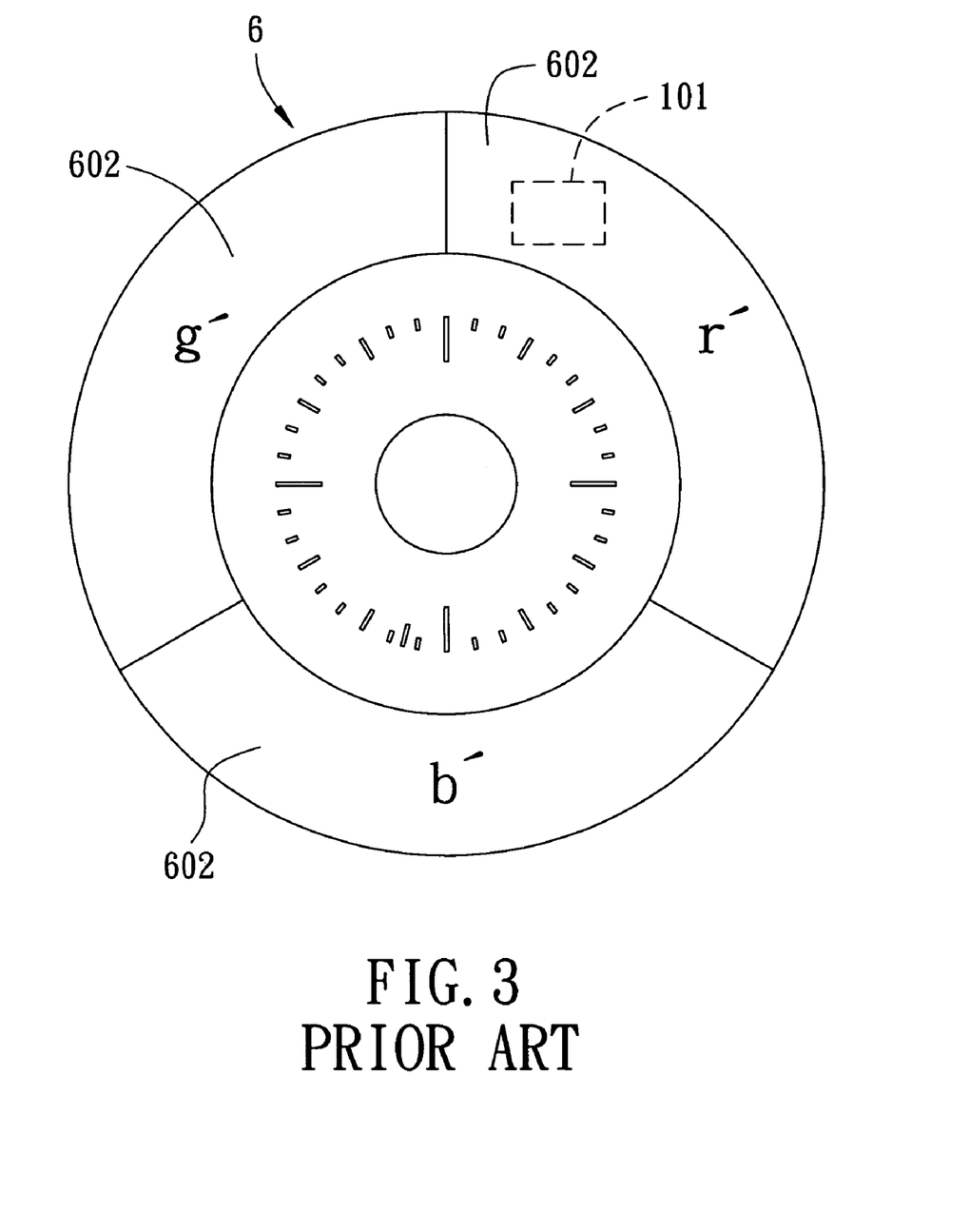
FIG. 3 is a schematic view of a transmissive color wheel used in a modified conventional optical projecting system.

2. As shown in FIG. 3, another transmissive color wheel 6 is used instead of the transmissive color wheel 3 in a modified conventional optical projecting system. The transmissive color wheel 6 includes three fan-shaped light-filtering components 602, which include red, blue and green light-filtering components (r'), (b'), (g') that allow transmission of red, blue and green light therethrough, respectively. Therefore, as with the red, blue and green light-filtering components (r), (b), (g) of the transmissive color wheel 3, the red, blue and green light-filtering components (r'), (b'), (g') of the transmissive color wheel 6 only allow corresponding colors of the focused source light 101 to be transmitted therethrough, with a major portion of the focused source light 101 reflected back to the light tunnel 2 (as shown in FIG. 1).

SUMMARY OF THE INVENTION

Therefore, the object of the present invention is to provide a reflective color wheel that effectively reduces losses in light energy, and that enhances brightness of projected images.

According to one aspect of the present invention, there is provided a reflective color wheel that is adapted to receive composite source light provided by a light source, and that includes a plurality of multi-layer light-reflecting sections for splitting the composite source light into a plurality of colored light beam components. Each of the multi-layer light-reflecting sections includes a plurality of light-filtering layers stacked along an axis. Each of the light-filtering layers of each of the multi-layer light-reflecting sections is capable of reflecting light within a predefined distinct wavelength range, and permits transmission of light outside the predefined distinct wavelength range therethrough. Sequences of the light-filtering layers of an adjacent pair of the multi-layer light-reflecting sections are different from each other.

According to another aspect of the present invention, there is provided a lighting device for providing a plurality of colored light beam components to a light-modulating unit of an optical projecting system. The lighting device includes a light source, a light-splitting unit, and a reflective color wheel. The light source is capable of providing composite source light. The light-splitting unit receives the composite source light provided by the light source, and splits the composite source light into a plurality of composite light beam components that travel in a first direction. The reflective color wheel is disposed to receive the composite light beam components from the light-splitting unit, is rotatable about a rotation axis, and includes a plurality of multi-layer light-reflecting sections for further splitting each of the composite light beam components into a plurality of colored light beam components. Each of the multi-layer light-reflecting sections includes a plurality of light-filtering layers stacked along the rotation axis. Each of the light-filtering layers of each of the multi-layer light-reflecting sections is capable of reflecting light within a predefined distinct wavelength range, and permits transmission of light outside the predefined distinct wavelength range therethrough. Sequences of the light-filtering layers of an adjacent pair of the multi-layer light-reflecting sections are different from each other.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Before the present invention is described in greater detail, it should be noted herein that like elements are denoted by the same reference numerals throughout the disclosure.

Figure 4:
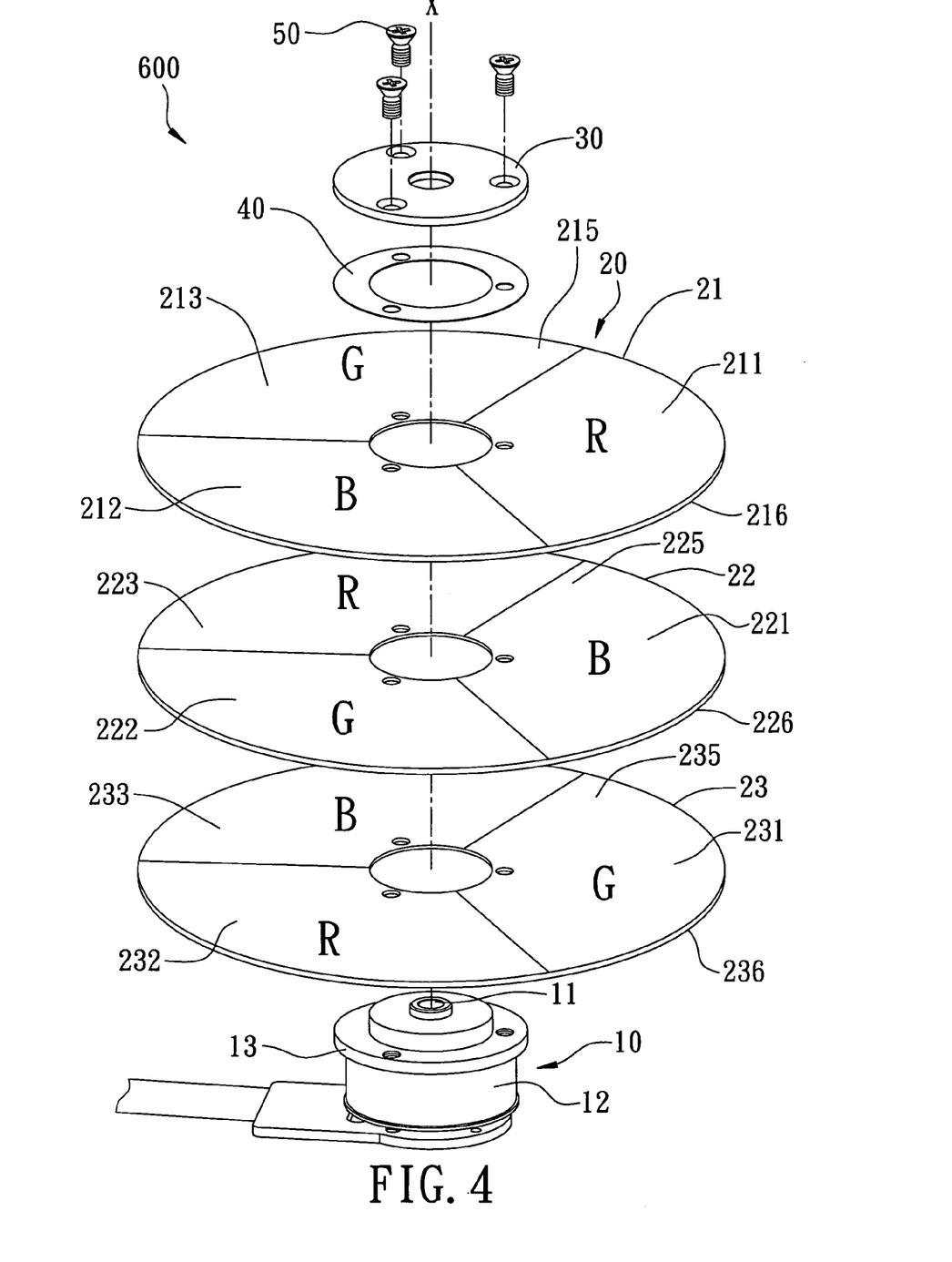
FIG. 4 is an exploded perspective view of the first preferred embodiment of a reflective color wheel according to the present invention.
Figure 5:
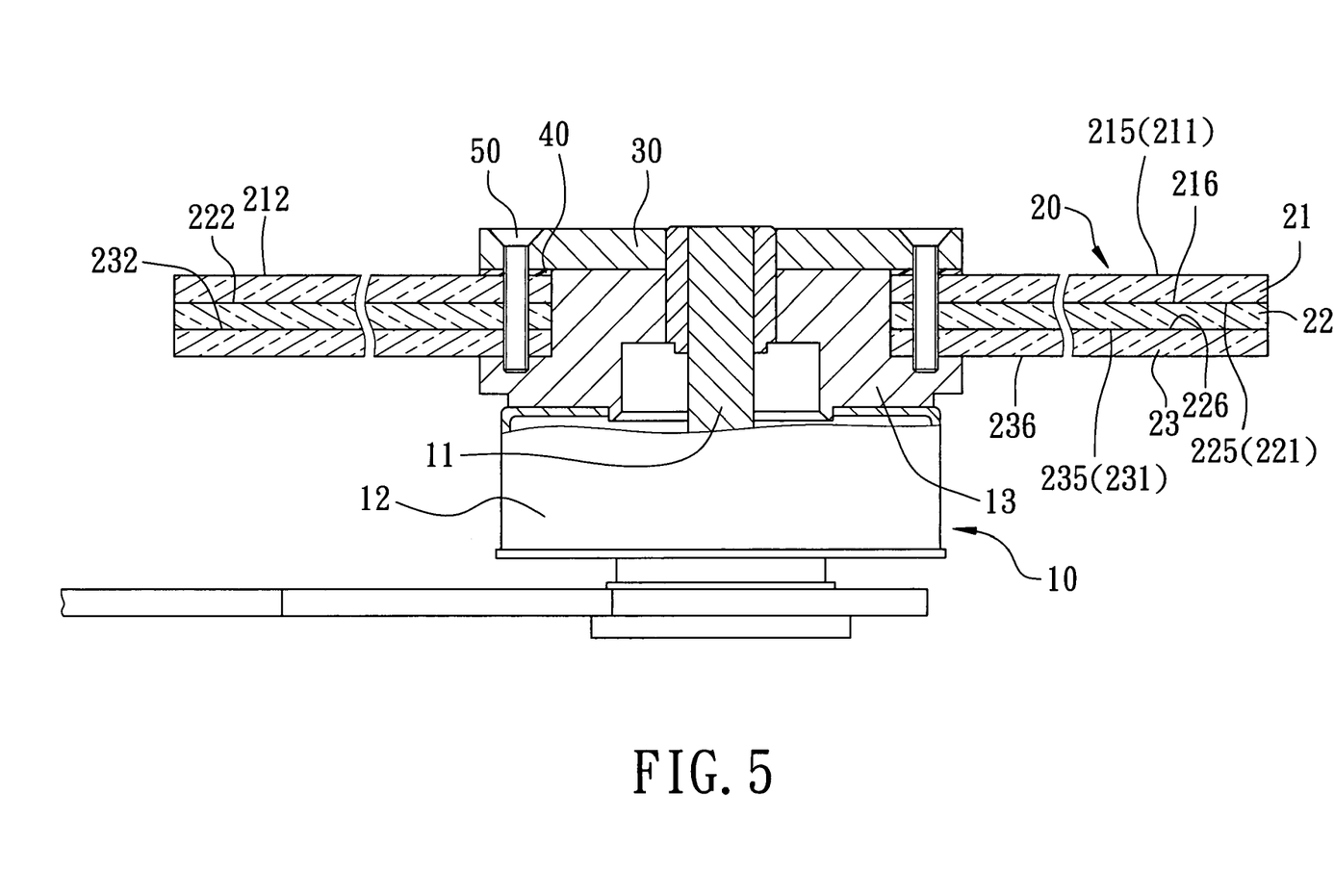
FIG. 5 is a fragmentary sectional view of the first preferred embodiment.
Figure 6:
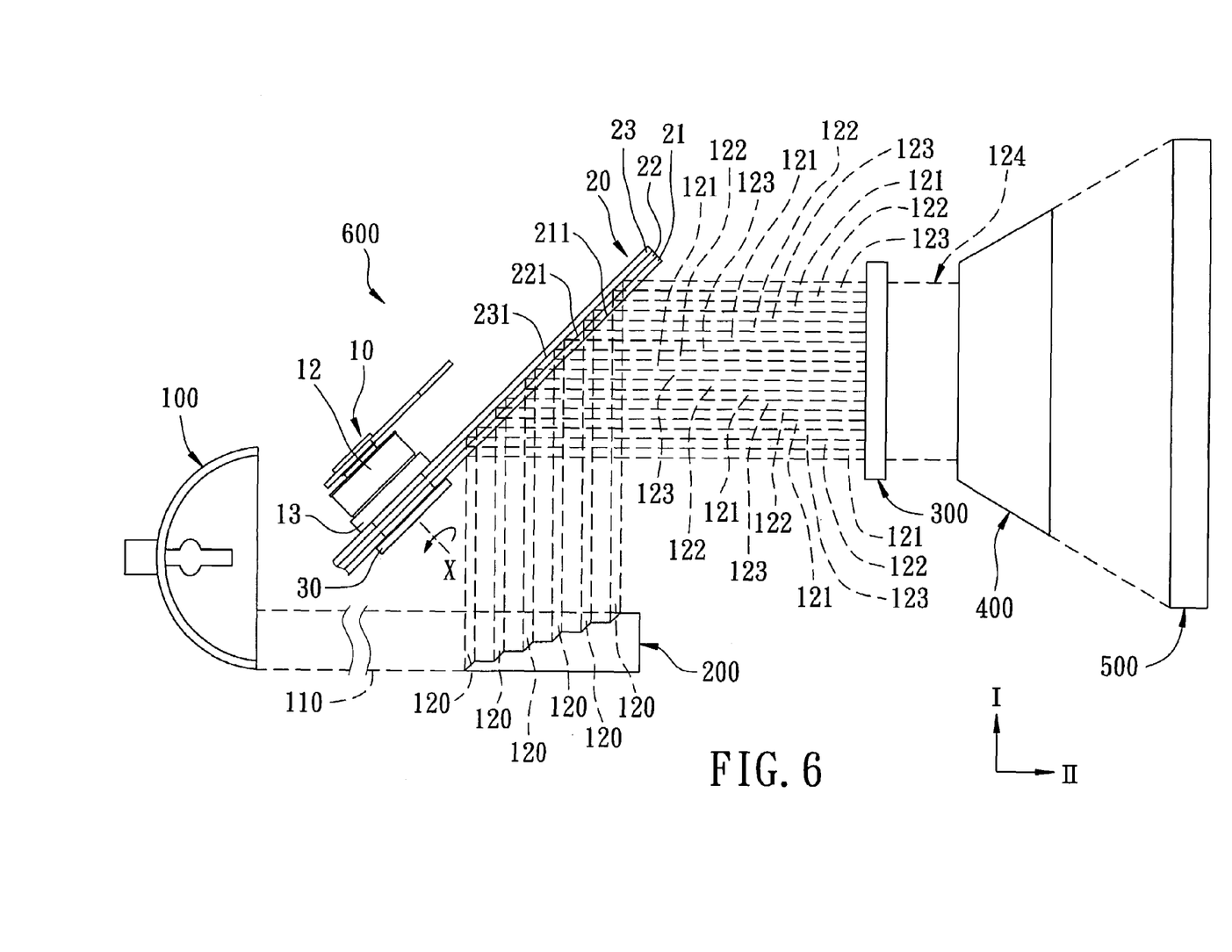
FIG. 6 is a schematic view of the reflective color wheel according to the first preferred embodiment when applied to an optical projecting system.

Shown in FIG. 4 and FIG. 5 is the first preferred embodiment of a reflective color wheel 600 according to the present invention. Shown in FIG. 6 is the reflective color wheel 600 according to the first preferred embodiment when applied to an optical projecting system. Aside from than the reflective color wheel 600, the optical projecting system includes a light source 100, a light-splitting unit 200, a light-modulating unit 300, a projecting lens 400, and a screen 500. The light source 100 is capable of providing composite source light 110. The light-splitting unit 200 receives the composite source light 110 provided by the light source 100, and splits the composite source light 110 into a plurality of composite light beam components 120. In this embodiment, the light-modulating unit 300 is a transmissive liquid crystal device. It should be noted herein that depending on a particular design of the optical projecting system, the light-modulating unit 300 can also be a reflective liquid crystal device or a digital micro-mirror device (DMD).

Referring to FIGS. 4 to 6, the reflective color wheel 600 is disposed to receive the composite light beam components 120 from the light-splitting unit 200, and is rotatable about a rotation axis (X). The reflective color wheel 600 includes a motor 10, a stack of light-filtering plates 20, a press cap 30, a washer 40, and a plurality of screw fasteners 50. The motor 10 drives rotation of the reflective color wheel 600, and includes a rotatable spindle 11, a rotor 12, and a hub 13 coupled to the spindle 11 and the rotor 12.

Figure 7:
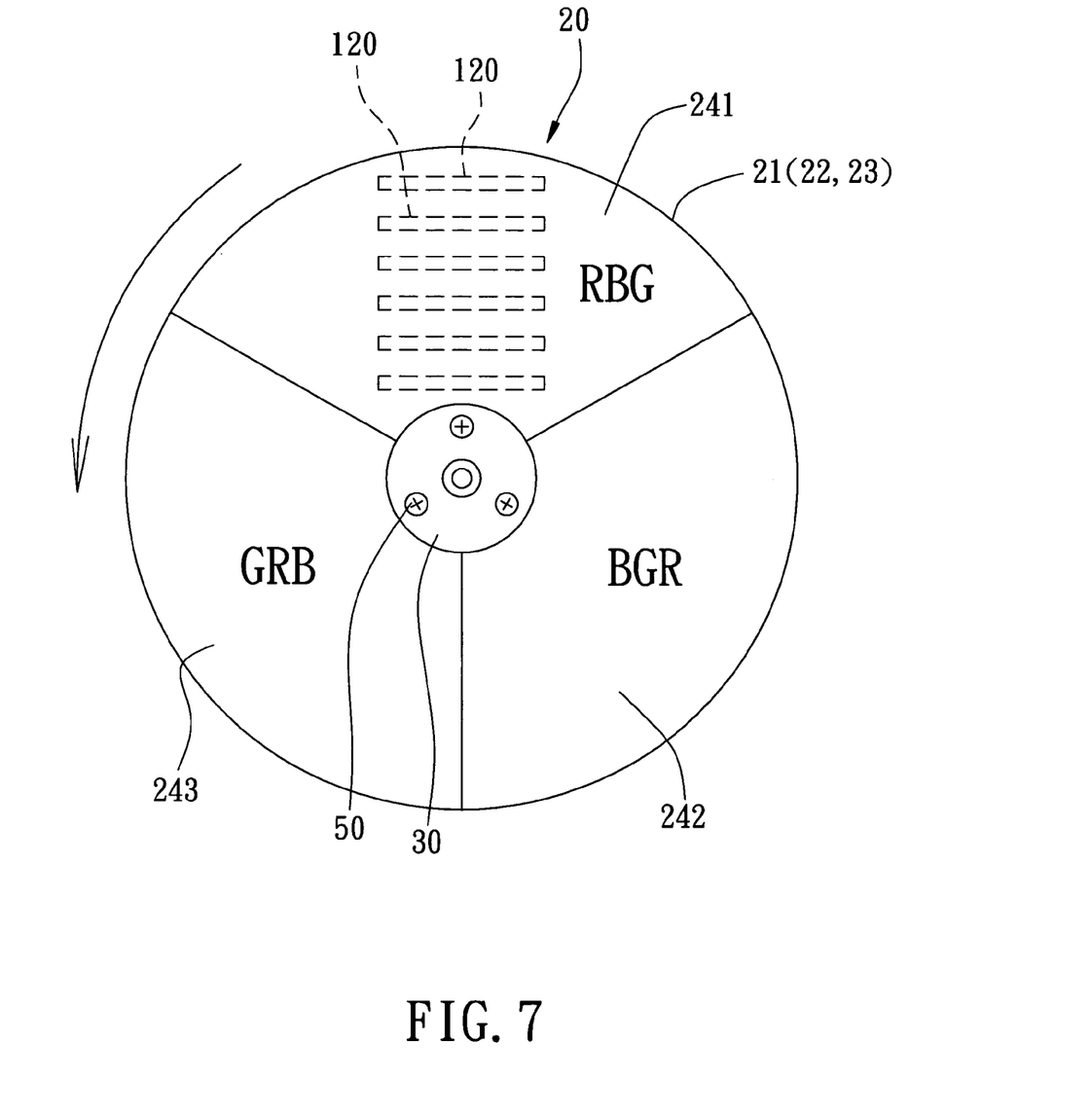
FIG. 7 is a schematic view of the first preferred embodiment, illustrating composite light beam components incident thereon.

With further reference to FIG. 7, the stack of light-filtering plates 20 is disposed on top of the hub 13 of the motor 10. In this embodiment, the stack of the light-filtering plates 20 includes first, second and third light-filtering plates 21, 22, 23. In this embodiment, the stacked first, second and third light-filtering plates 21, 22, 23 altogether constitute first, second and third multi-layer light-reflecting sections 241, 242, 243 for further splitting each of the composite light beam components 120 into a plurality of colored light beam components 121, 122, 123. Each of the first, second and third multi-layer light-reflecting sections 241, 242, 243 includes a plurality of light-filtering layers stacked along the rotation axis (X).

In particular, each of the first, second and third light-filtering plates 21, 22, 23 includes a plurality of light-filtering segments around the rotation axis (X). In this embodiment, the light-filtering segments of each of the first, second and third light-filtering plates 21, 22, 23 include first, second and third light-filtering segments. In particular, the first light-filtering plate 21 includes first, second and third light-filtering segments 211, 212, 213. The second light-filtering plate 22 includes first, second and third light-filtering segments 221, 222, 223. The third light-filtering plate 23 includes first, second and third light-filtering segments 231, 232, 233. Those light-filtering segments that are aligned along the rotation axis (X) constitute the light-filtering layers of a corresponding one of the first, second and third multi-layer light-reflecting sections 241, 242, 243. In particular, the first light-filtering segments 211, 221, 231 of the first, second and third light-filtering plates 21, 22, 23 are aligned along the rotation axis (X), and constitute the light-filtering layers of the first multi-layer light-reflecting section 241. The second light-filtering segments 212, 222, 232 of the first, second and third light-filtering plates 21, 22, 23 are aligned along the rotation axis (X), and constitute the light-filtering layers of the second multi-layer light-reflecting section 242. The third light-filtering segments 213, 223, 233 of the first, second and third light-filtering plates 21, 22, 23 are aligned along the rotation axis (X), and constitute the light-filtering layers of the third multi-layer light-reflecting section 243.

Each of the light-filtering layers of each of the first, second and third multi-layer light-reflecting sections 241, 242, 243 is capable of reflecting light within a predefined distinct wavelength range, and permits transmission of light outside the predefined distinct wavelength range therethrough. It is noted that sequences of the light-filtering layers of an adjacent pair of the multi-layer light-reflecting sections 241, 242, 243 are different from each other.

In this embodiment, the first, second and third light-filtering segments 211, 212, 213 of the first light-filtering plate 21 are capable of reflecting light within first, second and third predefined distinct wavelength ranges (R), (B), (G), respectively. The first, second and third predefined distinct wavelength ranges (R), (B), (G) correspond to wavelength ranges of red, blue and green light, respectively. The first, second and third light-filtering segments 221, 222, 223 of the second light-filtering plate 22 are capable of reflecting light within the second, third and first predefined distinct wavelength ranges (B), (G), (R), respectively. The first, second and third light-filtering segments 231, 232, 233 of the third light-filtering plate 23 are capable of reflecting light within the third, first and second predefined distinct wavelength ranges (G), (R), (B), respectively.

As the composite light beam components 120 reach the first multi-layer light-reflecting section 241 of the reflective color wheel 600, the light-filtering layers thereof, i.e., the first light-filtering segments 211, 221, 231 of the first, second and third light-filtering plates 21, 22, 23, further split each of the composite light beam components 120 into first, second and third colored light beam components 121, 122, 123 in sequence. The first, second and third colored light beam components 121, 122, 123 are light beam components within the first, second and third predefined distinct wavelength ranges (R), (B), (G), respectively. In other words, the first, second and third colored light beam components 121, 122, 123 are red, blue and green light beam components, respectively. As the composite light beam components 120 reach the second multi-layer light-reflecting section 242 of the reflective color wheel 600, the light-filtering layers thereof, i.e., the second light-filtering segments 212, 222, 232 of the first, second and third light-filtering plates 21, 22, 23, further split each of the composite light beam components 120 into second, third and first colored light beam components 122, 123, 121 in sequence. As the composite light beam components 120 reach the third multi-layer light-reflecting section 243 of the reflective color wheel 600, the light-filtering layers thereof, i.e., the third light-filtering segments 213, 223, 233 of the first, second and third light-filtering plates 21, 22, 23, further split each of the composite light beam components 120 into third, first and second colored light beam components 123, 121, 122 in sequence.

In this embodiment, since the light-splitting unit 200 splits the composite source light 110 into six composite light beam components 120, and since each of the first, second and third multi-layer light-reflecting sections 241, 242, 243 includes three light-filtering layers for further splitting each of the composite light beam components 120 into the first, second and third colored light beam components 121, 122, 123, there are a total of eighteen colored light beam components 121, 122, 123 available from the reflective color wheel 600.

Specifically, the light-splitting unit 200 is capable of reflecting the composite source light 110 from the light source 100 in a first direction (I) toward the reflective color wheel 600 to result in the composite light beam components 120. The reflective color wheel 600 is capable of reflecting the composite light beam components 120 from the light-splitting unit 200 in a second direction (II) transverse to the first direction (I) to result in the first, second and third colored light beam components 121, 122, 123.

In this embodiment, the first light-filtering plate 21 further includes first coated and first abutting surfaces 215, 216 opposite to each other. The first, second and third light-filtering segments 211, 212, 213 of the first light-filtering plate 21 are provided on the first coated surface 215. The second light-filtering plate 22 further includes second coated and second abutting surfaces 225, 226 opposite to each other. The second coated surface 225 confronts the first abutting surface 216 of the first light-filtering plate 21. The first, second and third light-filtering segments 221, 222, 223 of the second light-filtering plate 22 are provided on the second coated surface 225. The third light-filtering plate 23 further includes third coated and third abutting surfaces 235, 236 opposite to each other. The third coated surface 235 confronts the second abutting surface 236 of the second light-filtering plate 23. The first, second and third light-filtering segments 231, 232, 233 of the third light-filtering plate 23 are provided on the third coated surface 236.

The press cap 30 and the first light-filtering plate 21 have the washer 40 disposed therebetween. The press cap 30 is fastened to the hub 13 of the motor 10 via the screw fasteners 50, which extend sequentially through the press cap 30, the washer 40, and the first, second and third light-filtering plates 21, 22, 23, and which engage threadedly the hub 13 of the motor 10. As a result, the first, second and third light-filtering plates 21, 22, 23 are clamped tightly between the press cap 30 and the hub 13.

The light-modulating unit 300 is disposed to receive the first, second and third colored light beam components 121, 122, 123 reflected by the reflective color wheel 600 theretoward, and is operable to modulate the first, second and third colored light beam components 121, 122, 123 in a conventional manner. When the reflective color wheel 600 rotates at a high speed, the first, second and third multi-layer light-reflecting sections 241, 242, 243 of the reflective color wheel 600 take turns in splitting the composite light beam components 12 into the first, second and third colored light beam components 121, 122, 123. Therefore, for every unit height on the light-modulating unit 300, the first, second and third colored light beam components 121, 122, 123 are illuminated thereon cyclically.

The projecting lens 400 is disposed between the light-modulating unit 300 and the screen 500 to receive modulated light beam components, which altogether form an image light 124, from the light-modulating unit 300. The projecting lens 400 focuses and projects the image light 124 onto the screen 500 to form colored images thereon.

In sum, the reflective color wheel 600 according to the first preferred embodiment of the present invention has the following advantages:

The reflective color wheel 600 is comprised of the first, second and third multi-layer light-reflecting sections 241, 242, 243, the light-filtering layers of each of which are capable of reflecting light within the first, second and third predefined distinct wavelength ranges (R), (B), (G), respectively. The first multi-layer light-reflecting section 241 is capable of reflecting light within the first, second and third predefined distinct wavelength ranges (R), (B), (G) in sequence to result in the first, second and third colored light beam components 121, 122, 123. The second multi-layer light-reflecting section 242 is capable of reflecting light within the second, third and first predefined distinct wavelength ranges (B), (G), (R) in sequence to result in the second, third and first colored light beam components 122, 123, 121. The third multi-layer light-reflecting section 243 is capable of reflecting light within the third, first and second predefined distinct wavelength ranges (G), (R), (B) in sequence to result in the third, first and second colored light beam components 123, 121, 122.

Regardless of which of the first, second and third multi-layer light-reflecting sections 241, 242, 243 the composite light beam components 120 reach, all three of the first, second and third colored light beam components 121, 122, 123 will be reflected toward the light-modulating unit 300 with minimal loss in light energy. Therefore, the present invention not only reduces the losses in light energy as compared to the transmissive color wheels 3, 6 (shown in FIG. 2 and FIG. 3) of the prior art, but also improves upon brightness of the images projected on the screen 500.

Figure 8:
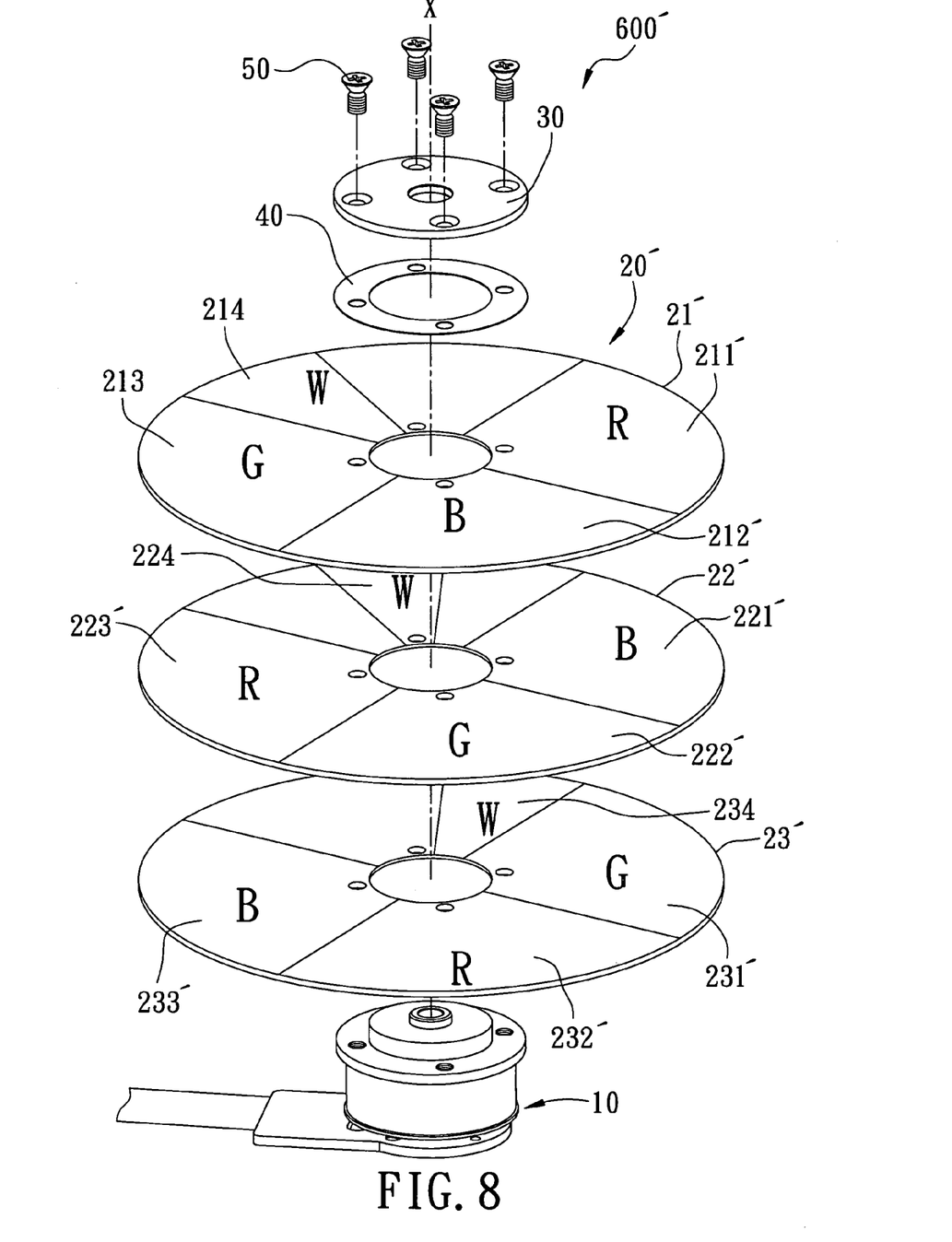
FIG. 8 is an exploded perspective view of the second preferred embodiment of a reflective color wheel according to the present invention.
Figure 10:
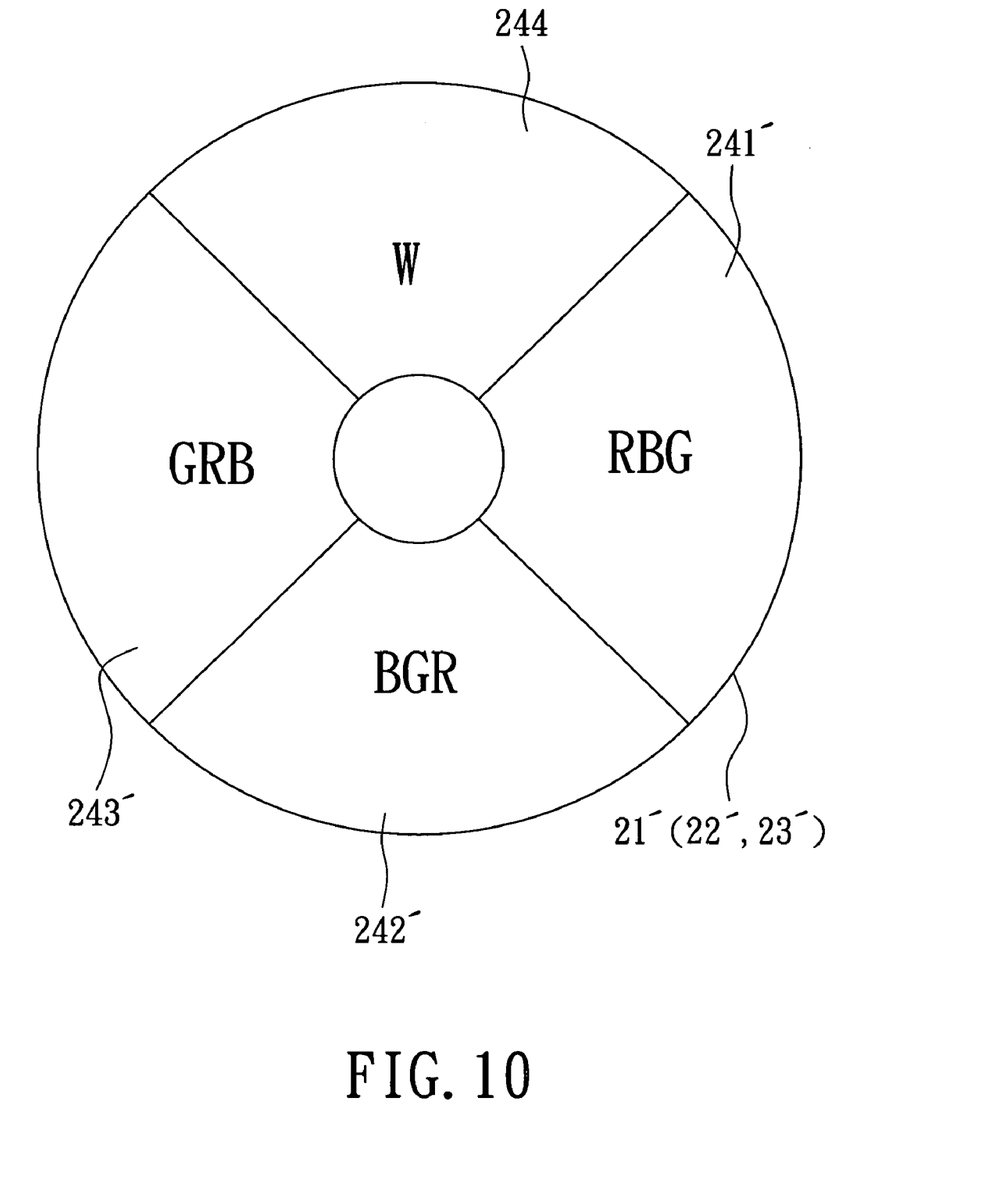
FIG. 10 is a schematic view of the second preferred embodiment.

As shown in FIG. 8 and FIG. 10, the second preferred embodiment of a reflective color wheel 600' according to the present invention differs from the reflective color wheel 600 of the previous embodiment in that the reflective color wheel 600' further includes a multi-layer composite light reflector 244 between an adjacent pair of the first, second and third multi-layer light-reflecting sections 241', 242', 243' for reflecting the composite light beam components 120 toward the light-modulating unit 300 without splitting the composite light beam components 120 into the colored light beam components 121, 122, 123. In other words, the multi-layer composite light reflector 244 is capable of reflecting light within the wavelength range of white light (W). In this embodiment, the multi-layer composite light reflector 244 is disposed between the first and third multi-layer light-reflecting sections 241', 243'.

Each of the first, second and third light-filtering plates 21', 22', 23' further includes a composite-light-reflecting segment 214, 224, 234. The composite-light-reflecting segments 214, 224, 234 of the light-filtering plates 21', 22', 23' are staggered relative to each other along the rotation axis (X), and constitute the multi-layer composite light reflector 244 of the reflective color wheel 600'. In this embodiment, the composite-light-reflecting segment 214 of the first light-filtering plate 21' is disposed between the first and third light-filtering segments 211', 213', and is proximate to the third light-filtering segment 213'. The composite-light-reflecting segment 224 of the second light-filtering plate 22' is disposed midway between the first and third light-filtering segments 221', 223'. The composite-light-reflecting segment 234 of the third light-filtering plate 23' is disposed between the first and third light-filtering segments 231', 233', and is proximate to the first light-filtering segment 231'.

Figure 9:
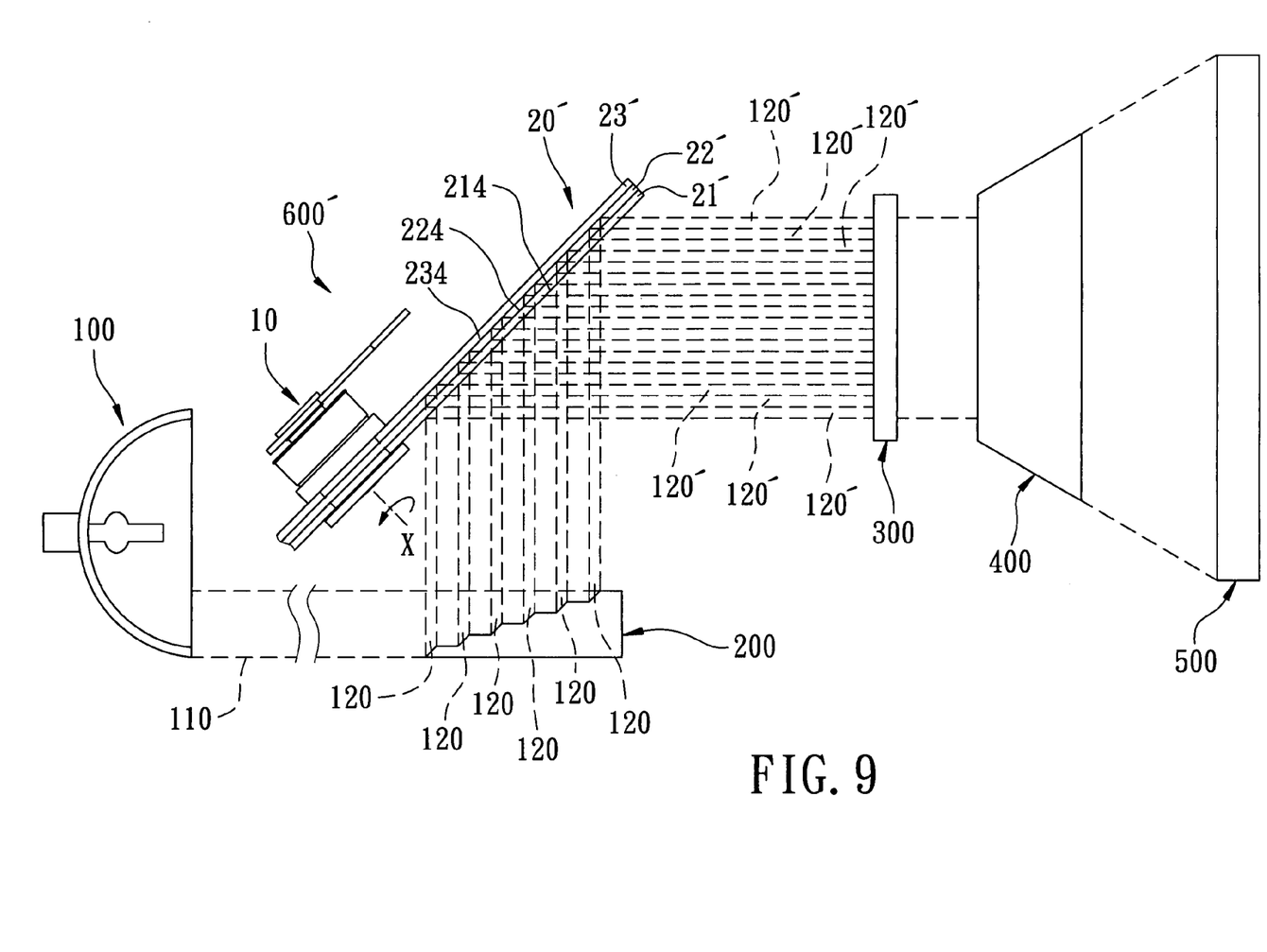
FIG. 9 is a schematic view of the reflective color wheel according to the second preferred embodiment when applied to an optical projecting system.

As shown in FIG. 9, each of the composite light beam components 120 that reach the multi-layer composite light reflector 244 of the reflective color wheel 600' is reflected toward the light-modulating unit 300 as three composite light beam sub-components 120'. With the addition of the multi-layer composite light reflector 244 in the reflective color wheel 600', not only are the advantages of the first preferred embodiment achieved, but brightness and contrast of the images projected by the projecting lens 400 onto the screen 500 are also enhanced.

In conclusion, the reflective color wheel according to the present invention effectively reduces the losses in light energy, and improves the brightness of images projected by an optical projecting system that utilizes the same.

While the present invention has been described in connection with what is considered the most practical and preferred embodiments, it is understood that this invention is not limited to the disclosed embodiments but is intended to cover various arrangements included within the spirit and scope of the broadest interpretation and equivalent arrangements.

What is claimed is:

1. A reflective color wheel adapted to receive composite source light provided by a light source, said reflective color wheel comprising:
    a stack of light-filtering plates disposed parallel to a plane that is transverse to an axis, each of said light-filtering plates including a plurality of light-filtering segments around the axis;
    a plurality of multi-layer light-reflecting sections for splitting the composite source light into a plurality of colored light beam components; and
    a multi-layer composite light reflector between an adjacent pair of said multi-layer light-reflecting sections for reflecting the composite source light without splitting the composite source light into the colored light beam components,
    each of said multi-layer light-reflecting sections including a plurality of light-filtering layers stacked along the axis, each of said light-filtering layers of each of said multi-layer light-reflecting sections being capable of reflecting light within a predefined distinct wavelength range, and permitting transmission of light outside the predefined distinct wavelength range therethrough, wherein sequences of said light-filtering layers of an adjacent pair of said multi-layer light-reflecting sections are different from each other,
    wherein said light-filtering segments of said light-filtering plates which are aligned along the axis constitute said light-filtering layers of a corresponding one of said multi-layer light-reflecting sections,
    wherein each of said light-filtering plates further includes a composite-light-reflecting segment,
    wherein said composite-light-reflecting segments of said light-filtering plates are staggered relative to each other along the axis and constitute said multi-layer composite light reflector.

2. The reflective color wheel as claimed in claim 1, wherein said stack of said light-filtering plates includes first, second and third light-filtering plates, said light-filtering segments of each of said first, second and third light-filtering plates including first, second and third light-filtering segments;
    wherein said first, second and third light-filtering segments of said first light-filtering plate reflect light within first, second and third predefined distinct wavelength ranges, respectively;
    wherein said first, second and third light-filtering segments of said second light-filtering plate reflect light within the second, third and first predefined distinct wavelength ranges, respectively;
    wherein said first, second and third light-filtering segments of said third light-filtering plate reflect light within the third, first and second predefined distinct wavelength ranges, respectively;
    wherein said first light-filtering segments of said first, second and third light-filtering plates are aligned along the axis and constitute said light-filtering layers of a first one of said multi-layer light-reflecting sections;
    wherein said second light-filtering segments of said first, second and third light-filtering plates are aligned along the axis and constitute said light-filtering layers of a second one of said multi-layer light-reflecting sections; and
    wherein said third light-filtering segments of said first, second and third light-filtering plates are aligned along the axis and constitute said light-filtering layers of a third one of said multi-layer light-reflecting sections.

3. The reflective color wheel as claimed in claim 2, wherein said first light-filtering plate further includes first coated and first abutting surfaces opposite to each other, said first, second and third light-filtering segments of said first light-filtering plate being provided on said first coated surface;
    wherein said second light-filtering plate further includes second coated and second abutting surfaces opposite to each other, said second coated surface confronting said first abutting surface of said first light-filtering plate, said first, second and third light-filtering segments of said second light-filtering plate being provided on said second coated surface; and
    wherein said third light-filtering plate further includes third coated and third abutting surfaces opposite to each other, said third coated surface confronting said second abutting surface of said second light-filtering plate, said first, second and third light-filtering segments of said third light-filtering plate being provided on said third coated surface.

4. The reflective color wheel as claimed in claim 1, further comprising a motor having a rotatable hub, said stack of said light-filtering plates being mounted on said hub for rotation about the axis.

5. The reflective color wheel as claimed in claim 4, further comprising a press cap fastened to said hub of said motor such that said stack of said light-filtering plates is clamped tightly between said press cap and said hub of said motor.

6. A lighting device for providing a plurality of colored light beam components to a light-modulating unit of an optical projecting system, said lighting device comprising:

a light source capable of providing composite source light;

a light-splitting unit for receiving the composite source light provided by said light source, and for reflecting and splitting the composite source light into a plurality of composite light beam components that travel in a first direction; and a reflective color wheel disposed to receive the composite light beam components from said light-splitting unit, rotatable about a rotation axis, and including a plurality of multi-layer light-reflecting sections for further splitting each of the composite light beam components into the colored light beam components, each of said multi-layer light-reflecting sections including a plurality of light-filtering layers stacked along the rotation axis, each of said light-filtering layers of each of said multi-layer light-reflecting sections being capable of reflecting light within a predefined distinct wavelength range, and permitting transmission of light outside the predefined distinct wavelength range therethrough, wherein sequences of said light-filtering layers of an adjacent pair of said multi-layer light-reflecting sections are different from each other.

7. The lighting device as claimed in claim 6, wherein said reflective color wheel includes a stack of light-filtering plates disposed parallel to a plane that is transverse to the rotation axis, each of said light-filtering plates including a plurality of light-filtering segments around the rotation axis; and wherein said light-filtering segments of said light-filtering plates which are aligned along the rotation axis constitute said light-filtering layers of a corresponding one of said multi-layer light-reflecting sections.

8. The optical projecting system as claimed in claim 7, wherein said stack of said light-filtering plates includes first, second and third light-filtering plates, said light-filtering segments of each of said first, second and third light-filtering plates including first, second and third light-filtering segments;

wherein said first, second and third light-filtering segments of said first light-filtering plate reflect light within first, second and third predefined distinct wavelength ranges, respectively;

wherein said first, second and third light-filtering segments of said second light-filtering plate reflect light within the second, third and first predefined distinct wavelength ranges, respectively;

wherein said first, second and third light-filtering segments of said third light-filtering plate reflect light within the third, first and second predefined distinct wavelength ranges, respectively;

wherein said first light-filtering segments of said first, second and third light-filtering plates are aligned along the rotation axis and constitute said light-filtering layers of a first one of said multi-layer light-reflecting sections of said reflective color wheel;

wherein said second light-filtering segments of said first, second and third light-filtering plates are aligned along the rotation axis and constitute said light-filtering layers of a second one of said multi-layer light-reflecting sections of said reflective color wheel; and wherein said third light-filtering segments of said first, second and third light-filtering plates are aligned along the rotation axis and constitute said light-filtering layers of a third one of said multi-layer light-reflecting sections of said reflective color wheel.

9. The lighting device as claimed in claim 7, wherein said reflective color wheel is capable of reflecting the composite light beam components from said light-splitting unit in a second direction transverse to said first direction to result in the colored light beam components.

10. The lighting device as claimed in claim 7, wherein said reflective color wheel further includes a multi-layer composite light reflector between an adjacent pair of said multi-layer light-reflecting sections for reflecting the composite light beam components from said light-splitting unit toward the light-modulating unit without splitting the composite light beam components into the colored light beam components, wherein each of said light-filtering plates further includes a composite-light-reflecting segment, and wherein said composite-light-reflecting segments of said light-filtering plates are staggered relative to each other along the rotation axis and constitute said multi-layer composite light reflector of said reflective color wheel.

11. A reflective color wheel adapted to receive composite source light provided by a light source, said reflective color wheel comprising:

a stack of light-filtering plates disposed parallel to a plane that is transverse to an axis, each of said light-filtering plates including a plurality of light-filtering segments around the axis, adjacent pairs of said light-filtering plates being in contact with each other; and a plurality of multi-layer light-reflecting sections for splitting the composite source light into a plurality of colored light beam components, each of said multi-layer light-reflecting sections including a plurality of light-filtering layers stacked along the axis, each of said light-filtering layers of each of said multi-layer light-reflecting sections being capable of reflecting light within a predefined distinct wavelength range, and permitting transmission of light outside the predefined distinct wavelength range therethrough, wherein sequences of said light-filtering layers of an adjacent pair of said multi-layer light-reflecting sections are different from each other, wherein said light-filtering segments of said light-filtering plates which are aligned along the axis constitute said light-filtering layers of a corresponding one of said multi-layer light-reflecting sections.

* * * * *